US006550150B1

(12) United States Patent
Shirai et al.

(10) Patent No.: US 6,550,150 B1
(45) Date of Patent: Apr. 22, 2003

(54) SURVEYING INSTRUMENT INCORPORATING A MAGNETIC INCREMENTAL ROTARY ENCODER

(75) Inventors: Masami Shirai, Saitama (JP); Katsuhiko Kenjo, Tokyo (JP)

(73) Assignees: Pentax Corporation, Tokyo (JP); Pentax Precision Co., Ltd., Tokyo (JP)

( * ) Notice: Subject to any disclaimer, the term of this patent is extended or adjusted under 35 U.S.C. 154(b) by 0 days.

(21) Appl. No.: 09/692,616

(22) Filed: Oct. 20, 2000

(30) Foreign Application Priority Data

Oct. 22, 1999 (JP) .......................................... 11-301117

(51) Int. Cl.[7] ............................................... G01C 15/00

(52) U.S. Cl. .......................... 33/290; 33/1 PT; 33/708; 324/207.21

(58) Field of Search ................................ 33/1 PT, 1 N, 33/290, 291, 292, 706, 707, 708; 324/207.21; 341/15

(56) References Cited

U.S. PATENT DOCUMENTS 4,786,891 A * 11/1988 Ueda et al. .................. 33/707
5,386,642 A * 2/1995 Spies et al. .................. 33/706
5,430,374 A * 7/1995 Metz ..................... 324/207.21
5,545,985 A * 8/1996 Campbell .............. 324/207.21
5,711,080 A * 1/1998 Yamada ....................... 33/292
5,746,005 A * 5/1998 Steinberg .................... 33/1 PT
5,949,548 A * 9/1999 Shirai et al. .................. 33/292
6,016,605 A * 1/2000 Hecht ......................... 33/1 PT
6,018,881 A * 2/2000 Spies .......................... 33/706
6,119,355 A * 9/2000 Raby ........................... 33/291
6,212,783 B1 * 4/2001 Ott et al. .................... 33/1 PT
6,246,233 B1 * 6/2001 Griffen et al. ......... 324/207.12
6,300,758 B1 * 10/2001 Griffen et al. ......... 324/207.12
6,304,079 B1 * 10/2001 Kenjo et al. ........... 324/207.21
6,354,010 B1 * 3/2002 Shirai .......................... 33/292

FOREIGN PATENT DOCUMENTS

DE 19906937 A1 * 9/2000 ............ G01B/7/14
JP 59217106 12/1984

OTHER PUBLICATIONS

Article entitled "External Magnetic Field Compensating Type Magnetic Encoder", pp. 47–53, by Takahashi et al., draft presented May 21, 1987, with English Language Translation.

* cited by examiner

*Primary Examiner*—Christopher W. Fulton
*Assistant Examiner*—Madeline Gonzalez
(74) *Attorney, Agent, or Firm*—Greenblum & Bernstein, P.L.C.

(57) ABSTRACT

A surveying instrument which incorporates a magnetic incremental rotary encoder includes a rotary magnetic drum provided on an outer peripheral surface thereof with a multi-pole magnetized layer having a plurality of equally-divided magnetized divisions; and at least two magnetic sensors, each of which detects a magnetic field generated by the multi-pole magnetized layer therefrom. Each of the at least two magnetic sensors detects a variation in the magnetic field due to a rotation of the rotary magnetic drum to measure an angle of rotation of the rotary magnetic drum, and the at least two magnetic sensors are arranged so that two of the at least two magnetic sensors are offset from each other to have a phase angle of an odd-numbered pitch angle therebetween.

7 Claims, 7 Drawing Sheets

54a
53a
53
54
$4b_{42}$
$4b_{41}$
$4b_{32}$
$4b_{31}$
$4b_{22}$
$4b_{21}$
$4b_{12}$
$4b_{11}$
$4a_{42}$
$4a_{41}$
$4a_{32}$
$4a_{31}$
$4a_{22}$
$4a_{21}$
$4a_{12}$
$4a_{11}$
$\lambda$
$\lambda/2$
$3/4\lambda$
$6\lambda+1/4\lambda$
N
S 61
Electric Circuit
+V
e0
e1
e'0
e'1
A Phase
+V
e0 e1
4a32
4a31
4a42
4a41
4a22
4a21
4a12
4a11
B Phase
+V
e'0 e'1
4b32
4b31
4b42
4b41
4b22
4b21
4b12
4b11

SURVEYING INSTRUMENT INCORPORATING A MAGNETIC INCREMENTAL ROTARY ENCODER

BACKGROUND OF THE INVENTION

1. Field of the Invention

The present invention relates to a surveying instrument which incorporates a magnetic incremental rotary encoder suitable for surveying instruments such as total stations theodolites or the like.

2. Description of the Related Art

Some conventional surveying instruments such as total stations, theodolites or the like are provided with an incremental rotary encoder as an angle measuring device. Conventionally, an optical incremental rotary encoder is frequently used because it has a high degree of stability and precision.

Similar to an optical incremental rotary encoder, a magnetic incremental rotary encoder is also known as an angle measuring device. A magnetic incremental rotary encoder is generally provided with a magnetic drum (graduator disc) and a magnetic sensor. The magnetic incremental rotary encoder is provided, on an outer peripheral surface of the magnetic drum thereof, with a multi-pole magnetized layer having a plurality of magnetized divisions equally divided by a number of divisions p ("p" being a positive integer). The magnetic sensor is positioned so as to face the multi-pole magnetized layer. This magnetic sensor is provided thereon with, e.g., four magnetoresistor elements (for instance, these four magnetoresistor elements are divided into two groups: an A-phase and a B-phase which are arranged to have a phase angle of ¼ or ⅜ pitch angle therebetween) which are disposed at predetermined intervals whose pitch is smaller than that of the plurality of magnetized divisions of the multi-pole magnetized layer to detect the variation in the resistance values of the four magnetoresistor elements, which vary in accordance with the rotation of the magnetic drum to thereby determine the zero crossing points of the outputs of the A-phase and the B-phase and the rotational angle of the magnetic drum according to an interpolative calculation "$\tan^{-1}$ (Aout/Bout)", wherein Aout and Bout represent the outputs of the A-phase and the B-phase, respectively.

In this type of magnetic incremental rotary encoder using magnetoresistor elements, it is ideal that a curve showing a variation of the magnetic reluctance of the magnetoresistor elements be substantially symmetrical about the zero point of the magnetic field. However, in reality, the variation curve is asymmetrical about the zero point of the magnetic field due to hysteresis which occurs in the vicinity of the zero point of the magnetic field. This is due to the fact that the position at which a magnetic domain wall is generated by the multi-pole magnetized layer of the magnetic drum varies in accordance with the direction of the magnetic field generated by the multi-pole magnetized layer of the magnetic drum. If the variation curve is asymmetrical about the zero point of the magnetic field in such a manner, a large error occurs when the magnetic drum is rotated slightly by a small angle of rotation.

Further, in a magnetic incremental rotary encoder, the resistance of each magnetoresistor element varies if the encoder suffers from an external magnetic field. This causes an error in the measured value. Accordingly, in the case of a surveying instrument which incorporates a magnetic incremental rotary encoder using magnetoresistor elements, the surveying instrument has to be designed to be immune from external magnetic fields.

SUMMARY OF THE INVENTION

An object of the present invention is to provide a surveying instrument which incorporates a magnetic incremental rotary encoder which is immune from hysteresis and external magnetic fields.

To achieve the object mentioned above, according to the present invention a surveying instrument is provided which incorporates a magnetic incremental rotary encoder, including a rotary magnetic drum provided on an outer peripheral surface thereof with a multi-pole magnetized layer having a plurality of equally-divided magnetized divisions; and at least two magnetic sensors, each of which detects a magnetic field generated by the multi-pole magnetized layer therefrom. Each of the at least two magnetic sensors detects a variation in the magnetic field due to a rotation of the rotary magnetic drum to measure an angle of rotation of the rotary magnetic drum, and the at least two magnetic sensors are arranged so that two of the at least two magnetic sensors are offset from each other to have a phase angle of an odd-numbered pitch angle therebetween.

In an embodiment, the at least two magnetic sensors are two magnetic sensors positioned closely to each other.

In an embodiment, the at least two magnetic sensors are two magnetic sensors which are located on opposite sides of the rotary magnetic drum to be offset from each other by approximately 180 degrees about an axis of the rotary magnetic drum.

According to another aspect of the present invention, a surveying instrument is provided which incorporates a magnetic incremental rotary encoder, including a rotary magnetic drum provided on an outer peripheral surface thereof with a multi-pole magnetized layer having a plurality of equally-divided magnetized divisions; and a magnetic sensor, which detects a magnetic field generated by the multi-pole magnetized layer therefrom, the magnetic sensor including a plurality of pairs of magnetoresistor elements. The magnetic sensor detects a variation in the magnetic field due to a rotation of the rotary magnetic drum to measure an angle of rotation of the rotary magnetic drum, and each pair of the plurality of pairs of magnetoresistor elements are arranged to be offset from each other so as to have a phase angle of an odd-numbered pitch angle therebetween.

In an embodiment, another magnetic sensor is located on the rotary magnetic drum to be offset from the other magnetic sensor about an axis of the rotary magnetic drum.

In an embodiment, the magnetic sensor has four pairs of magnetoresistor elements which are arranged so that any adjacent two pairs thereof are offset from each other so as to have a phase angle of 1/2 pitch angle therebetween.

In an embodiment, the magnetic sensor includes a first group of four pairs of magnetoresistor elements which are arranged so that any adjacent two pairs thereof are offset from each other so as to have a phase angle of 1/2 pitch angle therebetween; and a second group of four pairs of magnetoresistor elements which are arranged so that any adjacent two pairs thereof are offset from each other so as to have a phase angle of 1/2 pitch angle therebetween. The first group and second group are arranged so as to have a phase angle of 3/4 pitch angle therebetween.

Preferably, the surveying instrument is a total station.

According to another aspect of the present invention, a surveying instrument is provided, including a leveling board; a pedestal coupled to the leveling board to be rotatable about a vertical axis relative to the leveling board; a collimating telescope coupled to the pedestal to be rotatable about a horizontal axis relative to the pedestal; a horizontal-angle measuring device for measuring an angle of rotation of the pedestal relative to the leveling board; and a vertical-angle measuring device for measuring an angle of rotation of the collimating telescope relative to the pedestal. At least one of the horizontal-angle measuring device and the vertical-angle measuring device includes a magnetic incremental rotary encoder. The magnetic incremental rotary encoder includes a rotary magnetic drum provided on an outer peripheral surface thereof with a multi-pole magnetized layer having a plurality of equally-divided magnetized divisions, a first magnetic sensor, and a second magnetic sensor; wherein the first and second magnetic sensors each include a plurality of pairs of magnetoresistor elements and are located on opposite sides of the rotary magnetic drum so that each of the first and second magnetic sensors faces the multi-pole magnetized layer. Each of the first and second magnetic sensors detects a magnetic field generated by the multi-pole magnetized layer therefrom. Each of the first and second magnetic sensors detects a variation in the magnetic field due to a rotation of the rotary magnetic drum to measure an angle of rotation of the rotary magnetic drum. Each pair of the plurality of pairs of magnetoresistor elements are arranged to be offset from each other so as to have a phase angle of an odd-numbered pitch angle therebetween.

The present disclosure relates to subject matter contained in Japanese Patent Application No.11-301117 (filed on Oct. 22, 1999) which is expressly incorporated herein by reference in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 1:
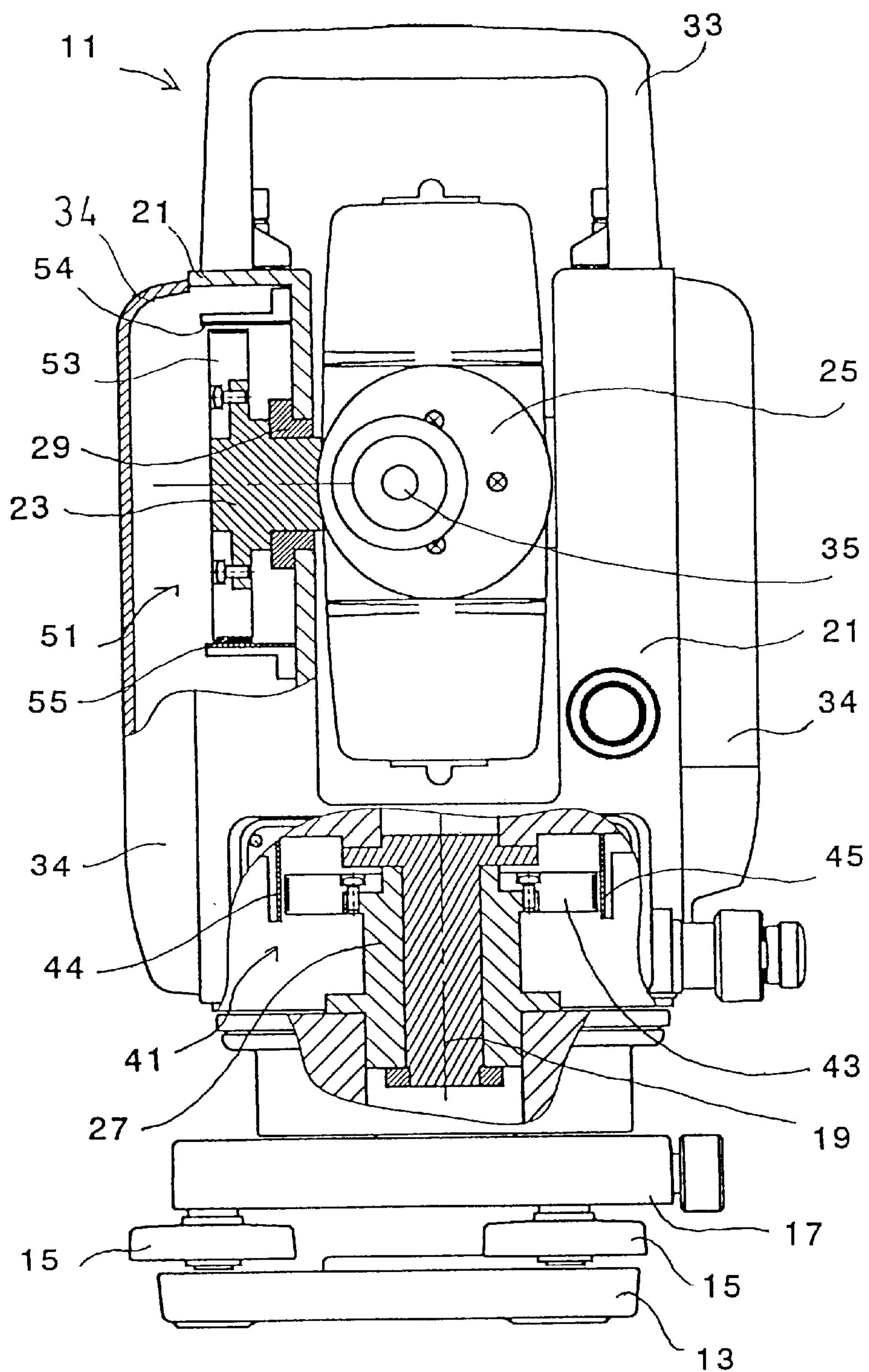
FIG. 1 is a rear elevational view of an embodiment of a total station which incorporates two magnetic incremental rotary encoders to which the present invention is applied, showing fundamental elements of each magnetic incremental rotary encoder in cross section.
Figure 2:
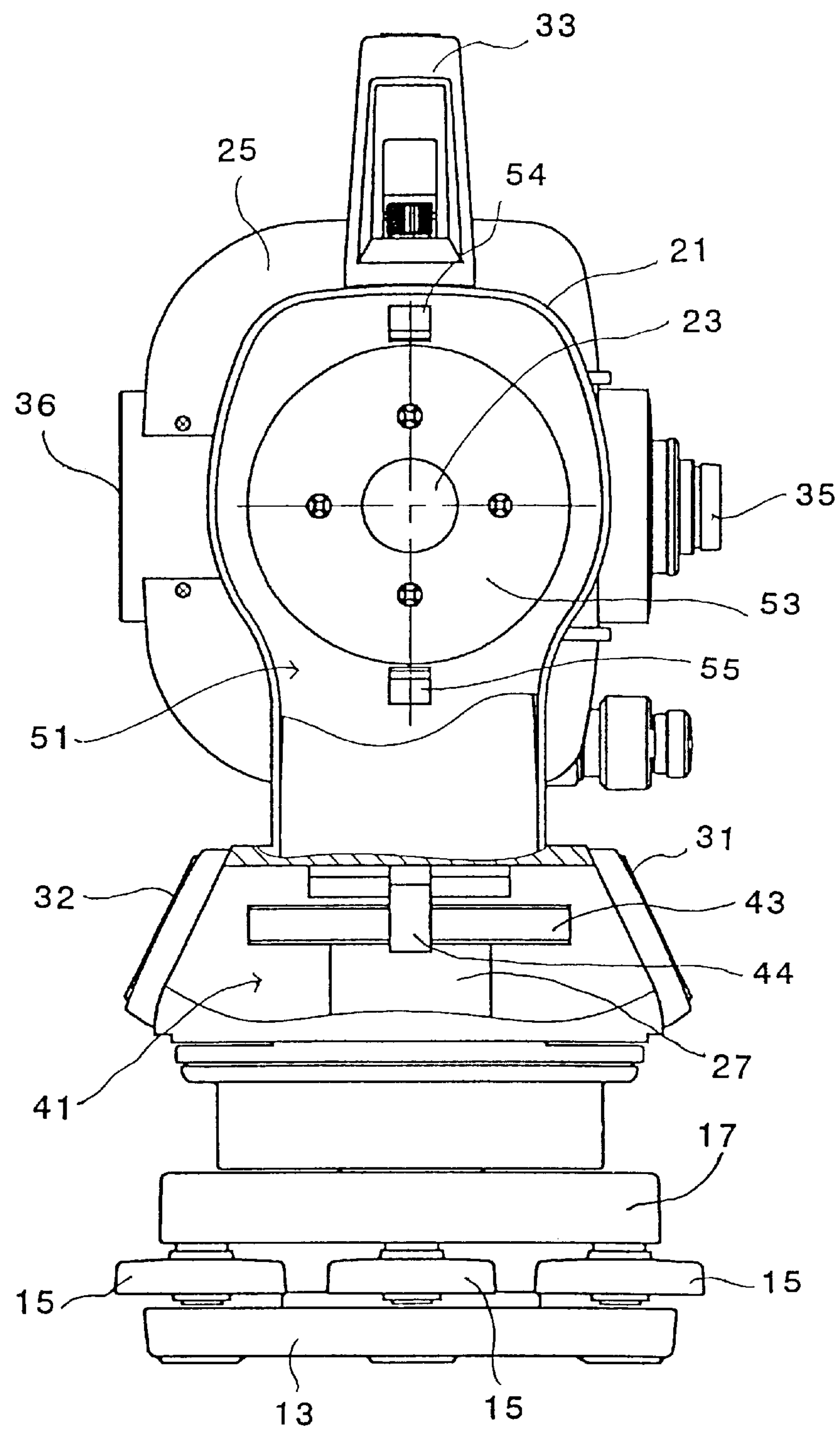
FIG. 2 is a side elevational view of the total station shown in FIG. 1, showing fundamental elements of each magnetic incremental rotary encoder in cross section.

FIGS. 1 and 2 show an embodiment of a total station which incorporates two magnetic incremental rotary encoders to which the present invention is applied.

The total station 11 is provided with a base plate 13, a leveling board 17, a pedestal (body/stationary member) 21 and a collimating telescope 25. The base plate 13 is connected to a tripod (not shown) when the total station 11 is mounted thereon. The base plate 13 is provided thereon with three leveling screws 15 on which the leveling board 17 is mounted. The pedestal 21 is mounted on the leveling board 17 via a vertical shaft 19 to be rotatable about the vertical shaft 19. The pedestal 21 is formed so as to have a general U-shaped cross section, and has a pair of supports 21*a* positioned on right and left sides as viewed in FIG. 1. The collimating telescope 25 is held by the pair of supports 21*a* therebetween to be rotatable about the axis of a pair of coaxial horizontal shafts 23 which are respectively fixed to the right and left sides of the collimating telescope 25 as viewed in FIG. 1. The pair of coaxial horizontal shafts 23 are respectively supported by the pair of supports 21*a* to be rotatable about the axis thereof. In FIG. 1 only one of the pair of coaxial horizontal shafts 23 (the left shaft 23 as viewed in FIG. 1) is shown (in cross section).

The vertical shaft 19 is rotatably fitted in and supported by a vertical bearing 27 which is fixed to the leveling board 17. The base of the pedestal 21 which connects the pair of supports 21*a* is fixed to the upper end of the vertical shaft 19. Each horizontal shaft 23 is rotatably supported by a corresponding horizontal bearing 29 fixed to the corresponding support 21*a*. Accordingly, the collimating telescope 25 is supported by the pedestal 21 via the two horizontal shafts 23 and the two horizontal bearings 29, and is rotatable about the vertical shaft 19 and the pair of horizontal shafts 23, which extend perpendicular to each other.

The total station 11 is provided on the vertical shaft 19 with a first magnetic incremental rotary encoder (first rotary encoder/horizontal-angle measuring device) 41 adapted for measuring the angle of rotation (horizontal angle) of the vertical shaft 19 (the pedestal 21 and the collimating telescope 25) with respect to the leveling board 17. The total station 11 is further provided on the horizontal shaft 23 with a second magnetic incremental rotary encoder (second rotary encoder/vertical-angle measuring device) 51 adapted for measuring the angle of rotation (vertical angle) of the horizontal shaft 23 (the collimating telescope 25) with respect to the pedestal 21. The first rotary encoder 41 is provided with a magnetic drum 43 (graduator disc) fixed to the vertical shaft 19. The magnetic drum 43 is provided on the outer peripheral surface thereof with a multi-pole magnetized layer (not shown). The first rotary encoder 41 is further provided with two magnetic sensors 44 and 45 which are positioned to face the multi-pole magnetized layer with a slight gap between each magnetic sensor and the multi-pole magnetized layer on opposite sides of the magnetic drum 43 (the right and left sides of the magnetic drum 43 as viewed in FIG. 1) with respect to the vertical shaft 19. The two magnetic sensors 44 and 45 are offset from each other by approximately 180 degrees about the vertical shaft 19. Likewise, the second rotary encoder 51 is provided with a magnetic drum (graduator disc) 53 fixed to the horizontal shaft 23. The magnetic drum 53 is provided on the outer peripheral surface thereof with a multi-pole magnetized layer 53*a* (see FIG. 3) which is identical to the multi pole magnetized layer of the magnetic drum 43. The second rotary encoder 51 is further provided with two magnetic sensors 54 and 55 which are positioned to face the multi pole magnetized layer 53*a* with a slight gap between each magnetic sensor and the multi-pole magnetized layer 53*a* on opposite sides of the magnetic drum 53 (the upper and lower sides of the magnetic drum 53 as viewed in FIG. 1) with respect to the horizontal shaft 23. The two magnetic sensors 54 and 55 are offset from each other by approximately 180 degrees about the horizontal shaft 23.

Although the details are not shown in the drawings, the total station 11 is provided in the base of the pedestal 21 with an electronic circuit 61 (see FIG. 5) which includes an operational device for determining the angle of rotation of each of the first and second rotary encoders 41 and 51 (i.e., horizontal and vertical angles) by detecting the output voltage of each of the magnetic sensors 44, 45, 54 and 55. The total station 11 is provided on the front and rear faces of the pedestal 21 with operational panels 31 and 32, respectively (see FIG. 2). Each of the operational panels 31 and 32 is provided thereon with a keyboard which is manually operated by an operator to operate and control the total station 11, and a display (e.g., an LCD panel) for indicating the data input by the keyboard, the measured angles, etc.

As shown in FIGS. 1 and 2, the total station 11 is further provided with a grip 33 which is gripped when the total station 11 is carried, and a protection cover 34 which is attached to the pedestal 21 to cover the same to protect the first rotary encoder 41 and battery (not shown) from dust. The collimating telescope 25 is provided with an objective lens 36 (see FIG. 2) and an eyepiece 35.

Figure 3:
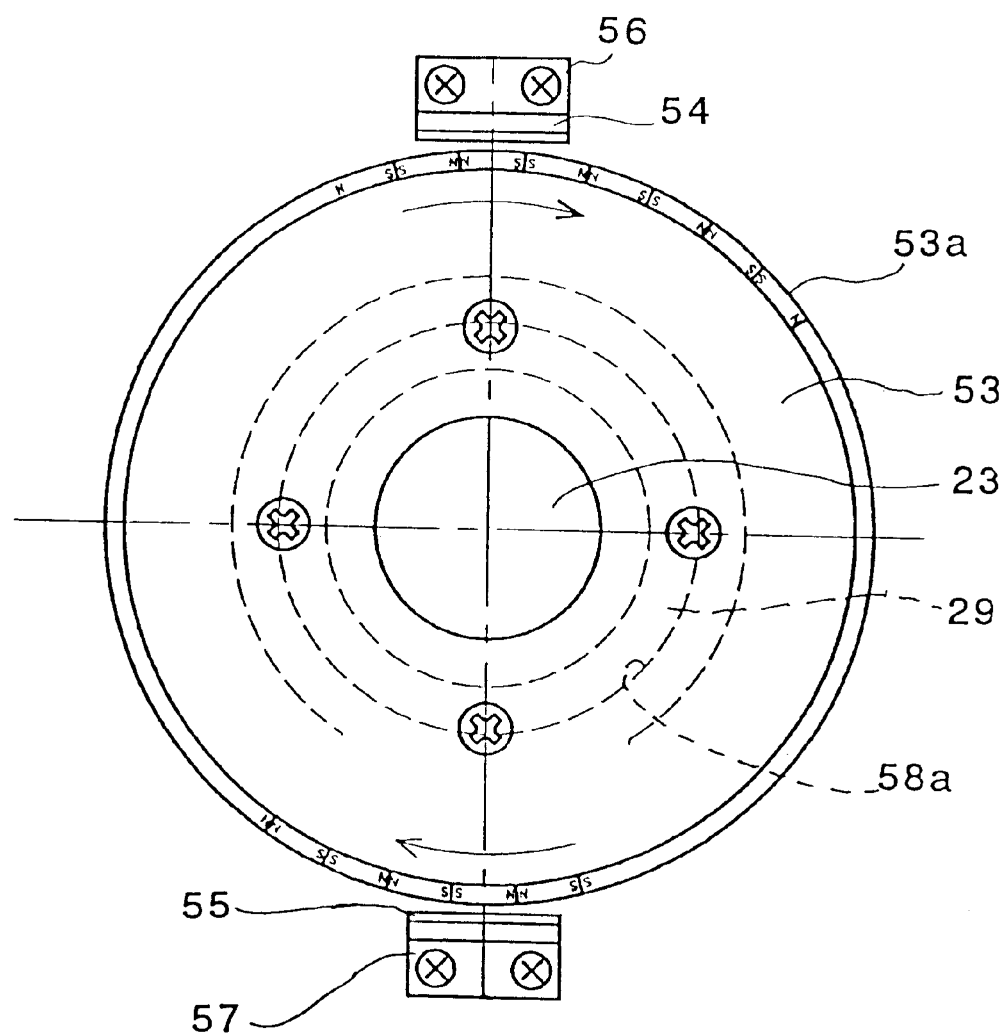
FIG. 3 is a plan view of an embodiment of a magnetic incremental rotary encoder shown in FIGS. 1 and 2.
Figure 4:
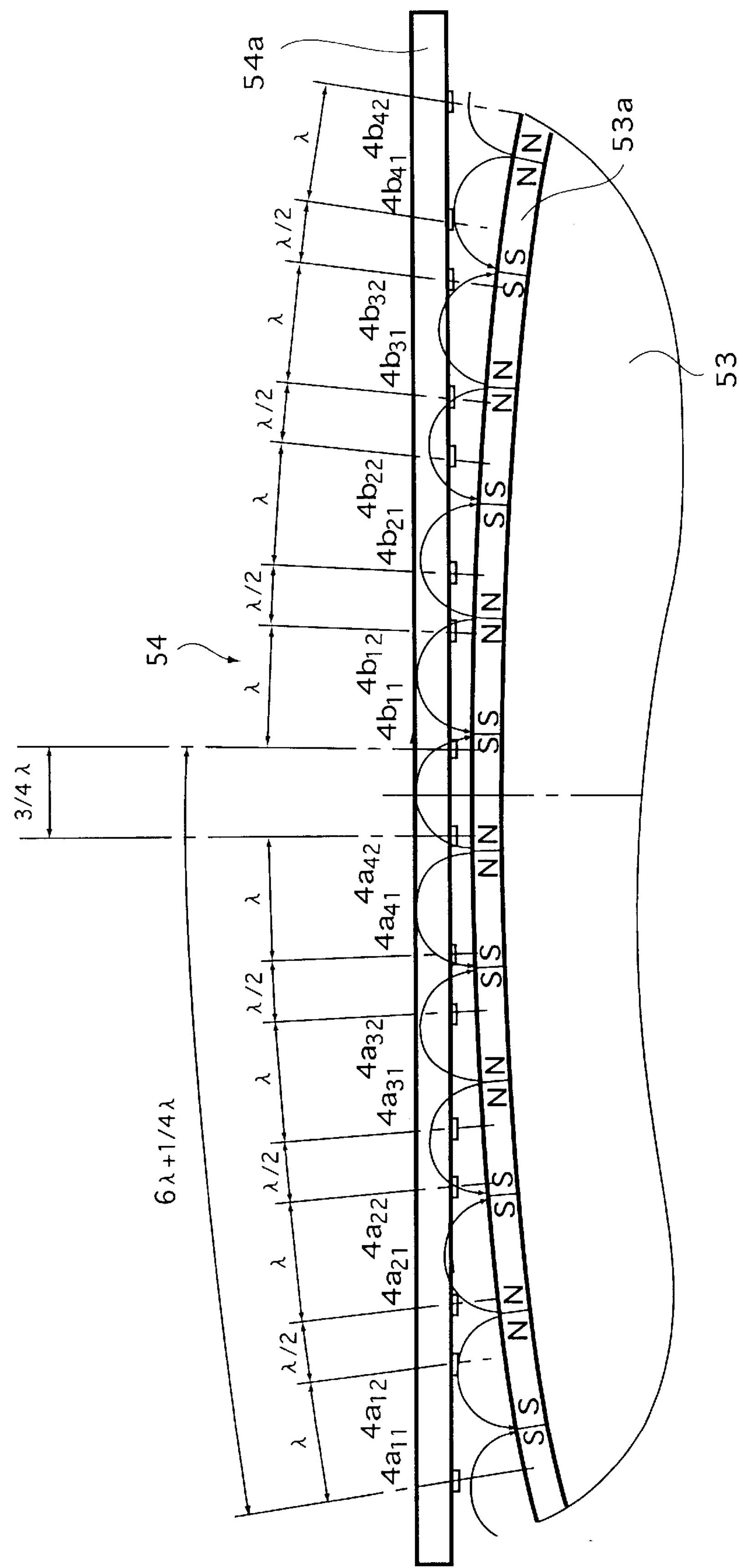
FIG. 4 is an explanatory view of part of a magnetic drum and a corresponding magnetic sensor of the magnetic incremental rotary encoder shown in FIG. 3, showing the first embodiment of the arrangement of magnetoresistor elements of the magnetic sensor.
Figure 5:
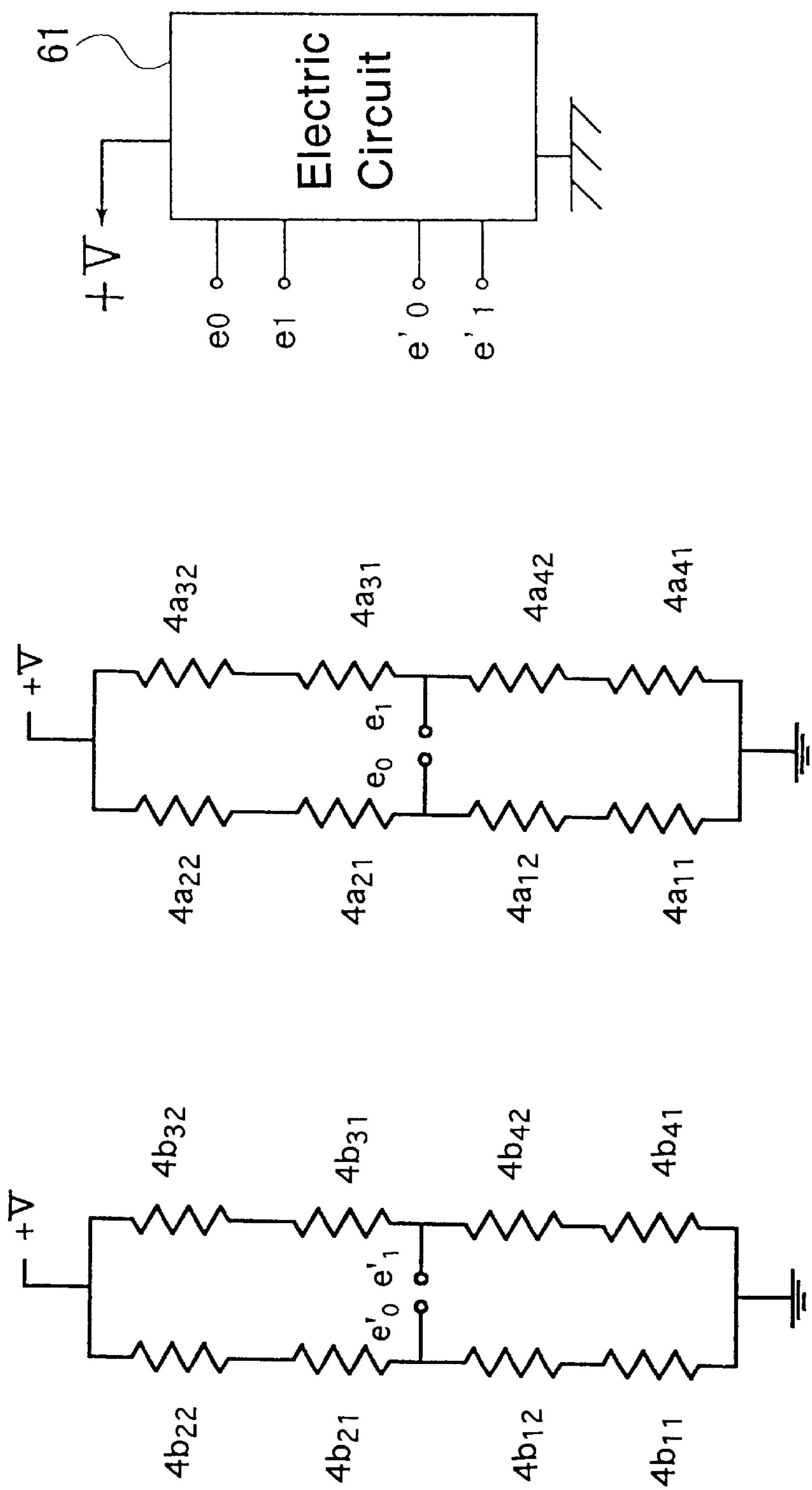
FIG. 5 is a schematic circuit diagram of an embodiment showing the electrical connection of an electronic circuit with the magnetoresistor elements shown in FIG. 4.

The structure of each of the first and second rotary encoders 41 and 51 will be hereinafter discussed in detail with reference to FIGS. 3, 4 and 5. The fundamental structure of the first rotary encoder 41 is identical to that of the second rotary encoder 51, so that only the structure of the second rotary encoder 51 will be hereinafter discussed in detail. FIG. 3 is an enlarged plan view of the second rotary encoder 51 shown in FIGS. 1 and 2. FIG. 4 is an enlarged cross sectional view of the second rotary encoder and peripheral components thereof shown in FIG. 1. FIG. 5 is an explanatory view of the magnetic sensor 54 and peripheral components thereof shown in FIG. 3, showing a relation between the multipole magnetized layer 53*a* and the magnetic sensor 54. The first and second magnetic sensors 54 and 55 are fixed to angles 56 and 57, respectively. The first magnetic sensor 54 is fixed to the pedestal 21 via the angle 56, while the second magnetic sensor 56 is fixed to the base plate 58 via the angle 57. The first and second magnetic sensors 54 and 55 are located on opposite sides of the magnetic drum 53 so as to be offset from each other by approximately 180 degrees about the axis of the magnetic drum 53. Since the structure of the second magnetic sensor 55 is identical to the structure of the first magnetic sensor 54, only the structure of the first magnetic sensor 54 will be hereinafter discussed in detail.

The second rotary encoder 51 is provided, on an outer peripheral surface of the magnetic drum 53 thereof, with the multi-pole magnetized layer 53*a* having a plurality of magnetized divisions equally divided by the number of divisions p ("p" being a positive integer). The pitch (pitch angle) of the magnetized divisions (i.e., the pitch of two adjacent borders of the magnetic poles) of the multi-pole magnetized layer 53*a* is herein assumed to be "λ". The first magnetic sensor 54 is positioned so as to face the multi-pole magnetized layer 53*a* with a slight gap between the first magnetic sensor 54 and the multi-pole magnetized layer 53*a*. The first magnetic sensor 54 is provided with a plane board 54*a* and sixteen magnetoresistor elements $4a_{11}$, $4a_{12}$, $4a_{22}$, $4a_{31}$, $4a_{32}$, $4a_{41}$, $4a_{42}$, $4b_{11}$, $4b_{12}$, $4b_{21}$, $4b_{22}$, $4b_{31}$, $4b_{32}$, $4b_{41}$ and $4b_{42}$. More specifically, the first magnetic sensor 54 is provided with eight pairs of magnetoresistor elements which are divided into two groups, i.e., a first group and a second group. The first group includes a first pair of magnetoresistor elements $4a_{11}$ and $4a_{12}$, a second pair of magnetoresistor elements $4a_{21}$, and $4a_{22}$, a third pair of magnetoresistor elements $4a_{31}$ and $4a_{32}$ and a fourth pair of magnetoresistor elements $4a_{41}$ and $4a_{42}$. The second group includes a first pair of magnetoresistor elements $4b_{11}$ and $4b_{12}$, a second pair of magnetoresistor elements $4b_{21}$ and $4b_{22}$, a third pair of magnetoresistor elements $4b_{31}$ and $4b_{32}$ and a fourth pair of magnetoresistor elements $4b_{41}$ and $4b_{42}$. In each of the first and second groups, as shown in FIG. 4, each pair of magnetoresistor elements are offset from each other to have a phase angle of 1λ therebetween, while any adjacent two pairs are offset from each other to have a phase angle of λ/2 therebetween. Furthermore, the first and second groups are arranged to have a phase angle of 3λ/4 therebetween. Each pair of magnetoresistor elements are acted upon by different magnetic poles of the multi-pole magnetized layer 53*a*, so that each pair of magnetoresistor elements mutually compensate for the difference in the variation of the resistance values between the pair of magnetoresistor elements due to the strength of the magnetic force of the different magnetic poles of the multi-pole magnetized layer 53*a*. Therefore, if the resistance values of each pair of magnetoresistor elements which mutually compensate for the difference in the variation of the resistance values therebetween are detected, the resistance values which are immune from hysteresis and/or external magnetic fields can be obtained.

In the present embodiment, when the sixteen magnetoresistor elements $4a_{11}$, $4a_{12}$, $4a_{22}$, $4a_{31}$, $4a_{32}$, $4a_{41}$, $4a_{42}$, $4b_{11}$ , $4b_{12}$, $4b_{21}$, $4b_{22}$, $4b_{31}$, $4b_{32}$, $4b_{41}$ and $4b_{42}$ are divided into two groups, i.e., an A-phase (the first group) consisting of eight magnetoresistor elements $4a_{11}$, $4a_{12}$, $4a_{22}$, $4a_{31}$, $4a_{32}$, $4a_{41}$ and $4a_{42}$, and a B-phase (the second group) consisting of the remaining eight magnetoresistor elements $4b_{11}$, $4b_{12}$, $4b_{21}$, $4b_{22}$, $4b_{31}$, $4b_{32}$, $4b_{41}$ and $4b_{42}$, the eight magnetoresistor elements $4a_{11}$, $4a_{12}$, $4a_{22}$, $4a_{31}$, $4a_{32}$, $4a_{41}$ and $4a_{42}$ of the A-phase are connected in the form of a bridge circuit, and the eight magnetoresistor elements $4b_{11}$, $4b_{12}$, $4b_{21}$, $4b_{22}$, $4b_{31}$, $4b_{32}$, $4b_{41}$ and $4b_{42}$ of the B-phase are also connected in the form of a bridge circuit as shown in FIG. 5.

The electric circuit 61 applies a constant voltage +V between the terminals of each of the two bridge circuits. The electric circuit 61 detects a variation of the magnetic field, i.e., a variation of the angle of rotation of the magnetic drum 53 in accordance with the voltage across terminals e0 and e1 of the A-phase and the voltage across terminals e0' and e1' of the B-phase. If the magnetic drum 53 rotates, the second rotary encoder 51 detects the voltages of the detection signals which appear across the terminals e0 and e1 and the terminals e0' and e1' via the electric circuit 61 due to the variation of the resistance values of the eight magnetoresistor elements $4a_{11}$, $4a_{12}$, $4a_{22}$, $4a_{31}$, $4a_{32}$, $4a_{41}$ and $4a_{42}$ of the A-phase and the eight magnetoresistor elements $4b_{11}$, $4b_{12}$, $4b_{21}$, $4b_{22}$, $4b_{31}$, $4b_{32}$, $4b_{41}$ and $4b_{42}$ of the B-phase, respectively, which vary in accordance with the variation of the magnetic field 3 generated by the multi-pole magnetized layer 53*a*, to thereby determine the rotational angle of the magnetic drum 53 at λ/4 pitch. An angle smaller than the pitch (λ/4) is determined according to an interpolative calculation.

According to this illustrated embodiment, the respective resistance values a11, a12, a21, a22, a31, a32, a41 and a42 of the eight magnetoresistor elements $4a_{11}$, $4a_{12}$, $4a_{22}$, $4a_{31}$, $4a_{32}$, $4a_{41}$ and $4a_{42}$ of the A-phase vary in accordance with the variation of the magnetic field 3 generated by the rotation of the magnetic drum 53, in accordance with the following equations:

$$a11=R0+R\sin(p\omega)$$

$$a12=R0+R\sin(p\omega+2\pi)=R0+R\sin(p\omega)$$

$$a21=R0+R\sin(p\omega+3\pi)=R0-R\sin(p\omega)$$

$$a22=R0+R\sin(p\omega+5\pi)=R0-R\sin(p\omega)$$

$$a31=R0+R\sin(p\omega+6\pi)=R0+R\sin(p\omega)$$

$$a32=R0+R\sin(p\omega+8\pi)=R0+R\sin(p\omega)$$

$$a41=R0+R\sin(p\omega+9\pi)=R0-R\sin(p\omega)$$

$$a42=R0+R\sin(p\omega+11\pi)=R0-R\sin(p\omega)$$

wherein "ω" represents the angle of rotation of the magnetic drum 53, "R0" represents the resistance value in the case of no magnetic field, "R" represents the resistance ratio (coefficient), and "p" represents the number of magnetized divisions of the multi-pole magnetized layer 53*a*.

If the difference in output between the terminals e0 and e1 is amplified, the output of the A-phase can be represented by the following equation:

$$Aout=\alpha\times4\times R\times V/R0\times\sin(p\omega)$$

wherein "Aout" represents the output of the A-phase, and "α" represents the amplification factor.

The magnetoresistor elements $4b_{11}$, $4b_{12}$, $4b_{21}$, $4b_{22}$, $4b_{31}$, $4b_{32}$, $4b_{41}$, and $4b_{42}$ of the B-phase are offset from the magnetoresistor elements $4a_{11}$, $4a_{12}$, $4a_{21}$, $4a_{22}$, $4a_{31}$, $4a_{32}$, $4a_{41}$, and $4a_{42}$ of the A-phase by 3π/4, so that the output of the B-phase can be represented by the following equation:

$$Bout=\alpha\times4\times R\times V/R0\times\cos(p\omega)$$

wherein "Bout" represents the output of the B-phase.

The angle of rotation of the magnetic drum 53 can be determined at a pitch of p/4 by detecting the zero crossing points of the outputs of the A-phase and the B-phase. Accordingly, the detection pitch is four times smaller than (i.e., a quarter of) the number of divisions p to realize a high resolution, so that the precision in detection can be made high. In surveying instruments, a detection pitch which is smaller than a quarter of the number of divisions p is sometimes required. To satisfy such a demand, in the illustrated embodiment, the number of divisions (detection pitch) is increased using the following calculation based on the A-phase and the B-phase.

$$\tan^{-1}(Aout/Bout)$$

As can be understood from the foregoing, in the above illustrated embodiment of the magnetic incremental rotary encoder using magnetoresistor elements which is incorporated in a surveying instrument, the magnetoresistor elements are disposed so as to compensate for hysteresis and/or external magnetic fields, the error which occurs due to hysteresis is removed, while it is possible to measure the horizontal or vertical angle precisely even in an area where the encoder cannot be avoided from external magnetic fields.

Figure 6:
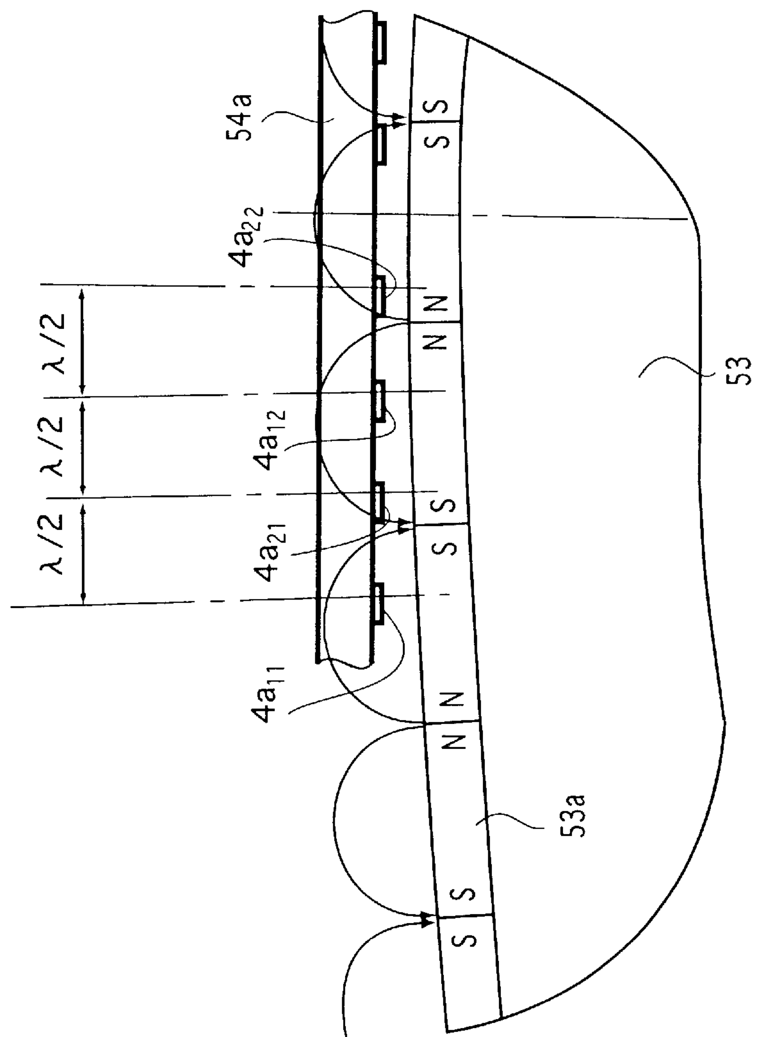
FIG. 6 is an explanatory view of part of a magnetic drum and a corresponding magnetic sensor of the magnetic incremental rotary encoder shown in FIG. 3, showing the second embodiment of the arrangement of magnetoresistor elements of the magnetic sensor; and, FIG. 7 is a plan view of a second embodiment of a magnetic incremental rotary encoder shown in FIGS. 1 and 2.

Although, in the illustrated embodiment shown in FIG. 4, two pairs of adjacent magnetoresistor elements (e.g., the two pairs of magnetoresistor elements $4a_{11}$, $4a_{12}$ and $4a_{21}$, $4a_{22}$) which are connected in series are disposed so as to have phase angles of λ, λ/2 and λ in this order, respectively, the same can be disposed at equally spaced intervals of λ/2 wherein the order of the magnetoresistor elements are $4a_{11}$, $4a_{21}$, $4a_{12}$ and $4a_{22}$, as shown in FIG. 6, while each of the A-phase and the B-phase can be connected in the form of a bridge circuit as shown in FIG. 5. In this case, although each pair of magnetoresistor elements are, offset from each other to have a phase angle of λ/2 therebetween, an effect similar to that in the illustrated embodiment in FIG. 4 can be expected because the pair of magnetoresistor elements $4a_{11}$ and $4a_{12}$ are offset from each other so as to have a phase angle of λ therebetween, the pair of magnetoresistor elements $4a_{21}$ and $4a_{22}$ are offset from each other so as to have a phase angle of λ therebetween, and the pair of magnetoresistor elements $4a_{11}$ and $4a_{12}$ are offset from the pair of magnetoresistor elements $4a_{21}$ and $4a_{22}$ so as to have a phase angle of λ/2 therebetween.

In the above illustrated embodiment, although each of the magnetic sensors 54 and 55 is designed with a combination of a plurality of pairs of magnetoresistor elements wherein each pair are offset from each other to have a phase angle of 1λ therebetween, the present invention is not limited solely to this particular embodiment. For instance, in the case of using two magnetic sensors each of which is not designed with such a combination of a plurality of pairs of magnetoresistor elements, the two magnetic sensors can be disposed on opposite sides of the magnetic drum 53 so as to be offset from each other by approximately 180 degrees about the axis of the magnetic drum, wherein the two sensors are offset from each other to have an odd-numbered phase angle λ (e.g., 1λ, 3λ or 5λ) therebetween with the output voltage of one of the two sensors being in phase with the other sensor. In this case, an effect similar to that in the illustrated embodiment in FIG. 4 can be expected by taking an average of the detection signals of the two sensors or the rotational angles of the magnetic drum which are determined via the two sensors according to an interpolative calculation.

Figure 7:
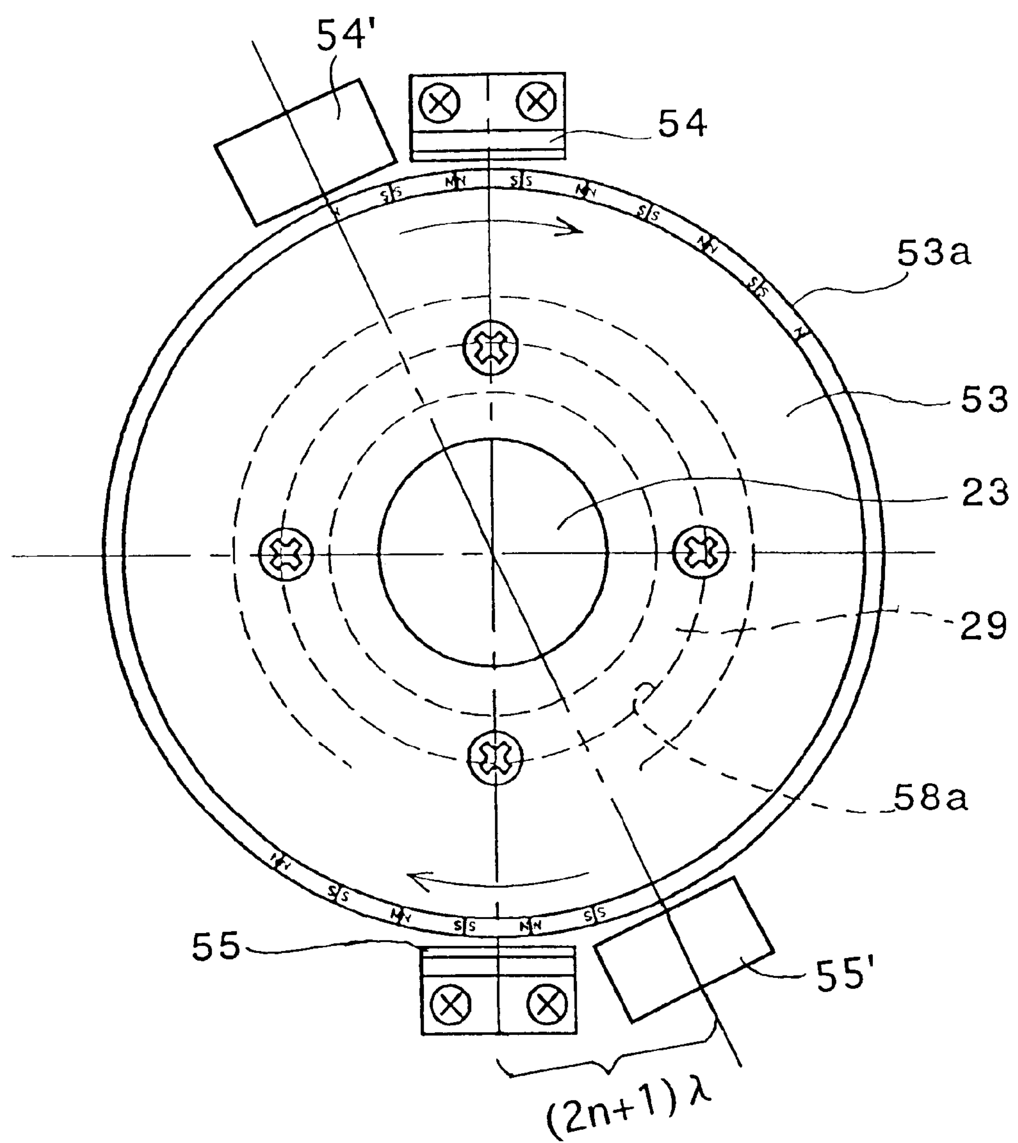

An additional magnetic sensor that is identical to each of the magnetic sensors 54' and 55' can be disposed closely to either magnetic sensor 54 or 55 so as to be offset from the either magnetic sensor 54' or 55' to have an odd-numbered phase angle λ ((2n+1)λ) therebetween with the output voltage of the additional magnetic sensor being in phase with the either magnetic sensor 54' or 55' (FIG. 7). In this case, an effect similar to that in the illustrated embodiment in FIG. 4 can be expected by taking an average of the detection signals of the three sensors or the rotational angles of the magnetic drum, which are determined via the three sensors according to an interpolative calculation.

The present invention can be applied not only to a total station like each of the above illustrated embodiments but also to any other surveying instrument such as levels, transits, theodolites, or the like.

As can be understood from the foregoing, according to a surveying instrument which incorporates a magnetic incremental rotary encoder to which the present invention is applied, since the magnetoresistor elements of the magnetic incremental rotary encoder incorporated in a surveying instrument are arranged so as to compensate for hysteresis and/or external magnetic fields, error due to hysteresis is removed, so that the angle of rotation of the magnetic drum can be detected with a high degree of precision. Furthermore, the angle of rotation of the magnetic drum can be detected with a high degree of precision even if the surveying instrument is used in an area where an external magnetic field exists since the magnetic sensors are immune from external magnetic fields.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A surveying instrument which incorporates a magnetic incremental rotary encoder, comprising:

a magnetic drum provided on an outer peripheral surface with a multi-pole magnetized layer having, a plurality of equally-divided magnetized divisions; and two magnetic sensors, each of which detects a magnetic field generated by said multi-pole magnetized layer said magnetic drum and said two magnetic sensors configured for relative rotation therebetween;

wherein each of said two magnetic sensors detects a variation in said magnetic field due to the relative rotation between said magnetic drum and said magnetic sensors to measure an angle of said relative rotation; and wherein said two magnetic sensors are arranged so that said magnetic sensors are offset from each other to have a phase angle of an odd-numbered pitch angle therebetween and such that said two magnetic sensors are located on opposing sectors of said magnetic drum offset from each other by approximately 180 degrees about an axis of said magnetic drum.

2. The surveying instrument according to claim 1, wherein said surveying instrument is a total station.

3. A surveying instrument which incorporates a magnetic incremental rotary encoder, comprising:

a magnetic drum provided on an outer peripheral surface thereof with a multi-pole magnetized layer having a plurality of equally-divided magnetized divisions;

a first magnetic sensor, which detects a magnetic field generated by said multi-pole magnetized layer, said first magnetic sensor comprising a plurality of pairs of magnetoresistor elements, and a second magnetic sensor which detects a magnetic field generated by said multi-pole magnetized layer, said second magnetic sensor comprising a plurality of pairs of magnetoresistor elements, said magnetic drum and said first and second magnetic sensors configured for relative rotation therebetween;

wherein said first and second magnetic sensors detect a variation in said magnetic field, due to the relative rotation between said magnetic drum and said first and second magnetic sensors, to measure an angle of said relative rotation;

wherein each pair of said plurality of pairs of magnetoresistor elements of said first and second magnetic sensors are offset from each other so as to have a phase angle of an odd-numbered pitch angle therebetween, and wherein said first and second magnetic sensors are located on opposing sectors of said magnetic drum so as to be offset from each other by approximately 180 degrees about the axis of said magnetic drum.

4. The surveying instrument according to claim 3, wherein each of said first and second magnetic sensors comprise four pairs of magnetoresistor elements which are arranged so that any adjacent two pairs thereof are offset from each other so as to have a phase angle of 1/2 pitch angle therebetween.

5. The surveying instrument according to claim 3, wherein each if said first and second magnetic sensors comprise:

a first group of four pairs of magnetoresistor elements which are arranged so that any adjacent two pairs thereof are offset from each other so as to have a phase angle of 1/2 pitch angle therebetween; and a second group of four pairs of magnetoresistor elements which are arranged so that any adjacent two pairs thereof are offset from each other so as to have a phase angle of 1/2 pitch angle therebetween, wherein said first group and second group are arranged so as to have a phase angle of 3/4 pitch angle therebetween.

6. The surveying instrument according to claim 3, wherein said surveying instrument is a total station.

7. A surveying instrument comprising:

a leveling board;

a pedestal coupled to said leveling board to be rotatable about a vertical axis relative to said leveling board;

a collimating telescope coupled to said pedestal to be rotatable about a horizontal axis relative to said pedestal;

a horizontal-angle measuring device that measures an angle of rotation of said pedestal relative to said leveling board; and a vertical-angle measuring device that measures an angle of rotation of said collimating telescope relative to said pedestal;

wherein at least one of said horizontal-angle measuring device and said vertical-angle measuring device comprises a magnetic incremental rotary encoder, said magnetic incremental rotary encoder comprising: a magnetic drum provided on an outer peripheral surface with a multi-pole magnetized layer having a plurality of equally-divided magnetized divisions; a first magnetic sensor; and a second magnetic sensor, said magnetic drum and said first and second magnetic sensors configured for relative rotation therebetween;

wherein said first and second magnetic sensors each comprise a plurality of pairs of magnetoresistor elements, each of said first and second magnetic sensors being located on opposing sectors of said magnetic drum so that each of said first and second magnetic sensors faces said multi-pole magnetized layer;

wherein each of said first and second magnetic sensors detects a magnetic field generated by said multi-pole magnetized layer;

wherein each of said first and second magnetic sensors detects a variation in said magnetic field, due to the relative rotation between said magnetic drum and said first and second magnetic sensors to measure an angle of rotation, and wherein each pair of said plurality of pairs of magnetoresistor elements are offset from each other so as to have a phase angle of an odd-numbered pitch angle therebetween.

* * * * *